United States Patent
Morita et al.

(10) Patent No.: US 6,822,414 B2
(45) Date of Patent: Nov. 23, 2004

(54) MOTOR CONTROLLER

(75) Inventors: Yuuki Morita, Yamanashi (JP); Shinichi Kono, Yamanashi (JP); Takahiro Akiyama, Yamanashi (JP)

(73) Assignee: Fanuc Ltd., Yamanashi (JP)

( * ) Notice: Subject to any disclaimer, the term of this patent is extended or adjusted under 35 U.S.C. 154(b) by 27 days.

(21) Appl. No.: 10/022,385

(22) Filed: Dec. 20, 2001

(65) Prior Publication Data

US 2002/0113571 A1 Aug. 22, 2002

(30) Foreign Application Priority Data

Dec. 25, 2000 (JP) ........................................ 2000-391888

(51) Int. Cl.$^7$ .......................... G01R 13/02; G05B 1/03
(52) U.S. Cl. ...................... 318/601; 318/490; 318/608
(58) Field of Search .................... 318/565, 600–602, 318/604–606, 608, 461, 463–464, 490; 388/909

(56) References Cited

U.S. PATENT DOCUMENTS

| | | | |
|---|---|---|---|
| 3,358,201 A | | 12/1967 | Jones |
| 3,676,765 A | * | 7/1972 | Westcott ...................... 322/58 |
| 3,800,898 A | * | 4/1974 | Griffin ......................... 180/205 |
| 3,898,563 A | * | 8/1975 | Erisman ...................... 324/166 |
| 4,074,177 A | | 2/1978 | Olig |
| 4,157,658 A | * | 6/1979 | Grice, Jr. .................. 73/862.28 |
| 4,224,515 A | * | 9/1980 | Terrell .................... 250/231.14 |
| 4,235,296 A | * | 11/1980 | Knothe et al. .............. 177/204 |
| 4,341,995 A | * | 7/1982 | Hennick ..................... 324/161 |
| 4,358,723 A | | 11/1982 | Scholl et al. |
| 4,527,101 A | * | 7/1985 | Zavis et al. .................. 318/245 |
| 4,954,763 A | | 9/1990 | Kumar et al. |
| 5,646,496 A | | 7/1997 | Woodland et al. |
| 5,811,946 A | * | 9/1998 | Mullin et al. ................ 318/254 |
| 5,978,742 A | * | 11/1999 | Pickerd ........................ 702/66 |

FOREIGN PATENT DOCUMENTS

| | | |
|---|---|---|
| JP | 6-319284 | 11/1994 |
| JP | 11-332273 | 11/1999 |
| JP | 2000-341985 | 12/2000 |

OTHER PUBLICATIONS

Schwinn's Instruction Manual for a bicycle computer, date unknown.*

* cited by examiner

Primary Examiner—Bentsu Ro

(57) ABSTRACT

A motor controller capable of obtaining information on offsets, amplitudes and a phase difference of analog feedback signals from encoders without using special measuring device. The analog feedback signals from the encoders are A/D converted and the offsets, the amplitudes and the phase difference of A-phase and B-phase analog feedback signals are obtained based on the converted digital signals by an arithmetic section. The obtained offsets, amplitudes and phase difference are displayed by a display section of the motor controller and/or a display section of a numerical controller as a host controller. Further, the obtained offsets and amplitudes are compared with respective reference values for determining acceptability of the feedback signals from the encoders and the results of the comparison is displayed by the display section and/or the display section of the numerical controller.

20 Claims, 6 Drawing Sheets

MOTOR CONTROLLER

BACKGROUND OF THE INVENTION

1. Field of the Invention

The present invention relates to a motor controller for performing control of a motor using analog feedback signals from encoders for detecting position and/or velocity of the motor or a movable member driven by the motor.

2. Description of the Related Art

Encoders to respectively output analog feedback signals of sine waves of A phase and B phase are generally adopted as detectors for detecting position and velocity of a motor or a movable member driven by the motor. An offset as displacement from a set value of a central voltage of amplitude, the amplitude and phase difference of the analog feedback signals of sine wave vary. Therefore, the analog feedback signals are observed using a special measurement device such as an oscilloscope to obtain information on the offsets, the amplitudes and the phase difference, and the feedback signals are adjusted based on the observation.

In the conventional art, an expert in operation of the oscilloscope is required to obtain the information on the offsets, amplitudes and phase difference using the special device such as oscilloscope in adjusting and confirming the analog feedback signals, and it is further required to make judgment on necessity of adjustment of the signals based on the information displayed on the oscilloscope. Thus, it has been difficult to adjust and confirm the signals based on the information on the offsets, amplitudes and phase difference.

SUMMARY OF THE INVENTION

The present invention enables obtaining information on offsets, amplitudes and a phase difference of analog feedback signals from encoders with ease.

The motor controller of the present invention performs control of position or velocity of a movable member mechanically connected with a motor using analog feedback signals from encoders for detecting rotational position or velocity of the motor, or position or velocity of the movable member, and the motor controller includes means for displaying information on at least one of amplitudes, offsets and a phase difference of the analog feedback signals on a display section of the motor controller or a host controller connected with the motor controller. Thereby, status of the feedback signals from the encoders can be perceived.

Further, the motor controller of the present invention may include means for displaying results of comparison of amplitudes and/or offsets of the analog feedback signals with respective predetermined values on the display section of the motor controller or the host controller.

The display section of the motor controller may include a LED display device or a seven-segmented display device. The information on at least one of the amplitudes, the offsets and the phase difference may be obtained based on A/D conversion values of the analog feedback signals. The motor controller may include means for calculating at least one of the offsets, the amplitudes and the phase difference of the analog feedback signals of two different phases.

DETAILED DESCRIPTION OF THE PREFERRED EMBODIMENTS

Figure 1:
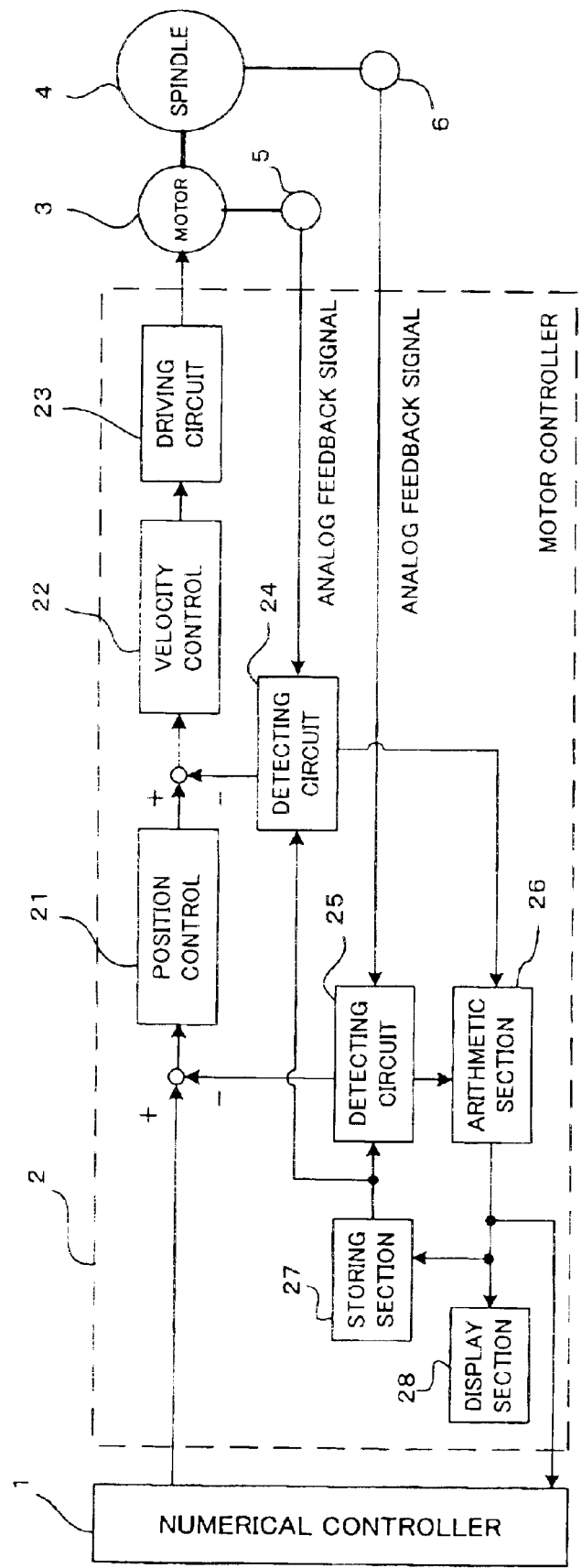
FIG. 1 is a block diagram of a servo control system including a motor controller according to an embodiment of the present invention.

FIG. 1 shows an example of a motor controller 2 for controlling a spindle motor 3 of a machine tool under control of a numerical controller 1 as a host controller.

In FIG. 1, a motor controller 2 comprises a position control section 21, a velocity control section 22, a driving circuit 23, detecting circuits 24 and 25, an arithmetic section 26, a storing section 27 and a display section 28 having a display device such as a LED display and a 7-segmented display. The display section 28 may be provided out of the motor controller 2 to be connected with the motor controller. An encoder 5 provided at an output shaft of the motor 3 and an encoder 6 provided at a spindle 4 respectively output analog signals of A-phase and B-phase having a phase difference of 90° in the form of sine waves to the detecting circuits 24 and 25 as velocity and position feedback signals.

The detecting circuit 24 performs an A/D conversion of the analog feedback signal from the encoder 5 and a compensation of the signal using amplitude ratio and phase difference compensation parameters, to feed back the compensated signal to the velocity control section 22 as a velocity feedback digital signal. The detecting circuit 25 performs an A/D conversion of the analog feedback signal from the encoder 6 and a compensation using amplitude ratio and phase difference compensation parameters, to feed back the compensated signal to the position control section 21 as a position feedback digital signal.

When a motion command is issued from the numerical controller 1 to the motor controller 2, the position control section 21 of the motor controller 2 performs a position feedback control based on the motion command from the numerical controller 1 and the position feedback digital signal from the detecting circuit 25 to obtain a velocity command and outputs the obtained velocity command to the velocity control section 22. The velocity control section 22 performs a velocity feedback control based on the velocity command from the position control section 21 and the velocity feedback digital signal from the detecting circuit 24 to obtain a torque command and outputs the obtained torque command to the driving circuit 23 to drivingly control the motor 3. Functions of the control sections, etc. other than the driving circuit 23 in the motor controller 2 are realized by software processing performed by a processor of the motor controller 2.

As shown in FIG. 1, the arithmetic section 26 and the display section 28 are provided in the motor controller 2 according to the present invention.

Thus, according to the present invention, offsets, an amplitude ratio, a phase difference of the analog feedback signals and compensation parameters are automatically obtained by the arithmetic section 26 and the obtained compensation parameters are written to be updated in the storing section 27. Further, the obtained offsets, amplitude ratio and phase difference are displayed by the display section 28 of the motor controller 2 on the display device such as 7-segmented LED display of the motor controller 2 and/or displayed on a display device provided in the numerical controller 1.

The processing to be performed by the arithmetic section 26 will be described.

Figure 2:
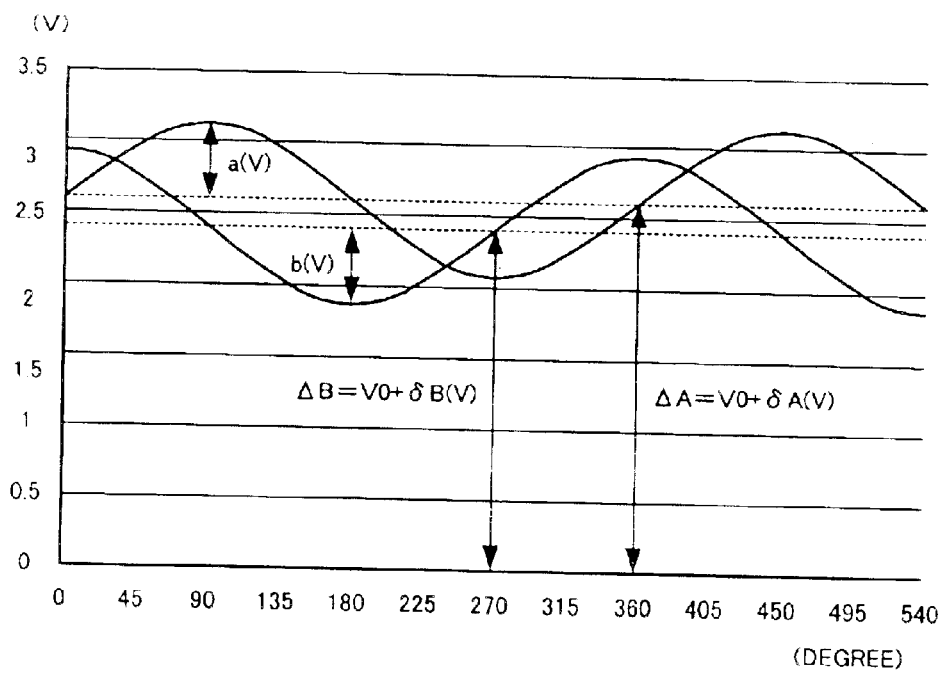
FIG. 2 is a diagram showing an example of wave forms of analog feedback signals from encoders.

FIG. 2 shows an example of analog feedback signals fed back from the encoders 5 and 6. The analog feedback signals are in the form of sine waves of A phase and B phase having a phase difference of (90°+α). The A-phase and B-phase signals have offsets of ΔA(=V0+δA) and ΔB(=V0+δB), and amplitudes of a(V) and b(V), respectively.

Thus, the A-phase feedback signal f(θ) is expressed as:

$$f(\theta) = a \cdot \sin\theta + \Delta A$$

The B-phase feedback signal g(θ) is expressed as:

$$g(\theta) = b \cdot \sin(\theta + 90° + \alpha) + \Delta B$$

$$= b \cdot \cos(\theta + \alpha) + \Delta B$$

Hereinafter, f(θ) and g(θ) are simply referred to as "f" and "g".

The feedback signals with the offsets cancelled are expressed as follows:

$$F(\theta) = a \cdot \sin\theta$$

$$G(\theta) = b \cdot \cos(\theta + \alpha)$$

Hereinafter, F(θ) and G(θ) are simply referred to as "F" and "G", respectively.

Figure 3:
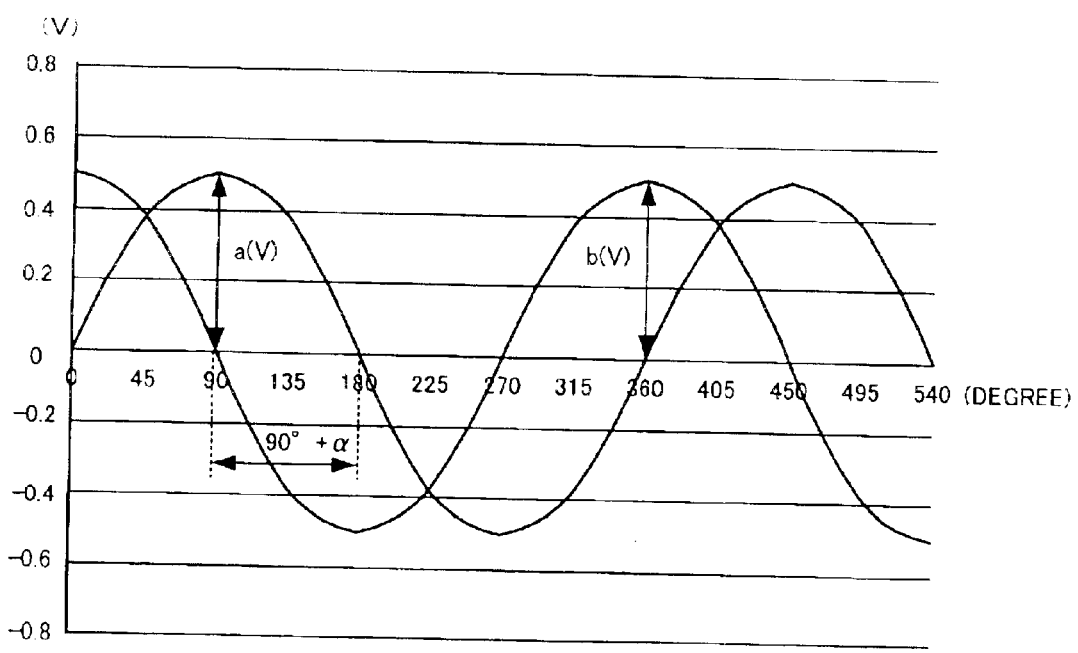
FIG. 3 is a diagram showing wave forms of the analog feedback signals with their offsets canceled.

The feedback signals with the offsets cancelled are shown in FIG. 3.

Figure 4:
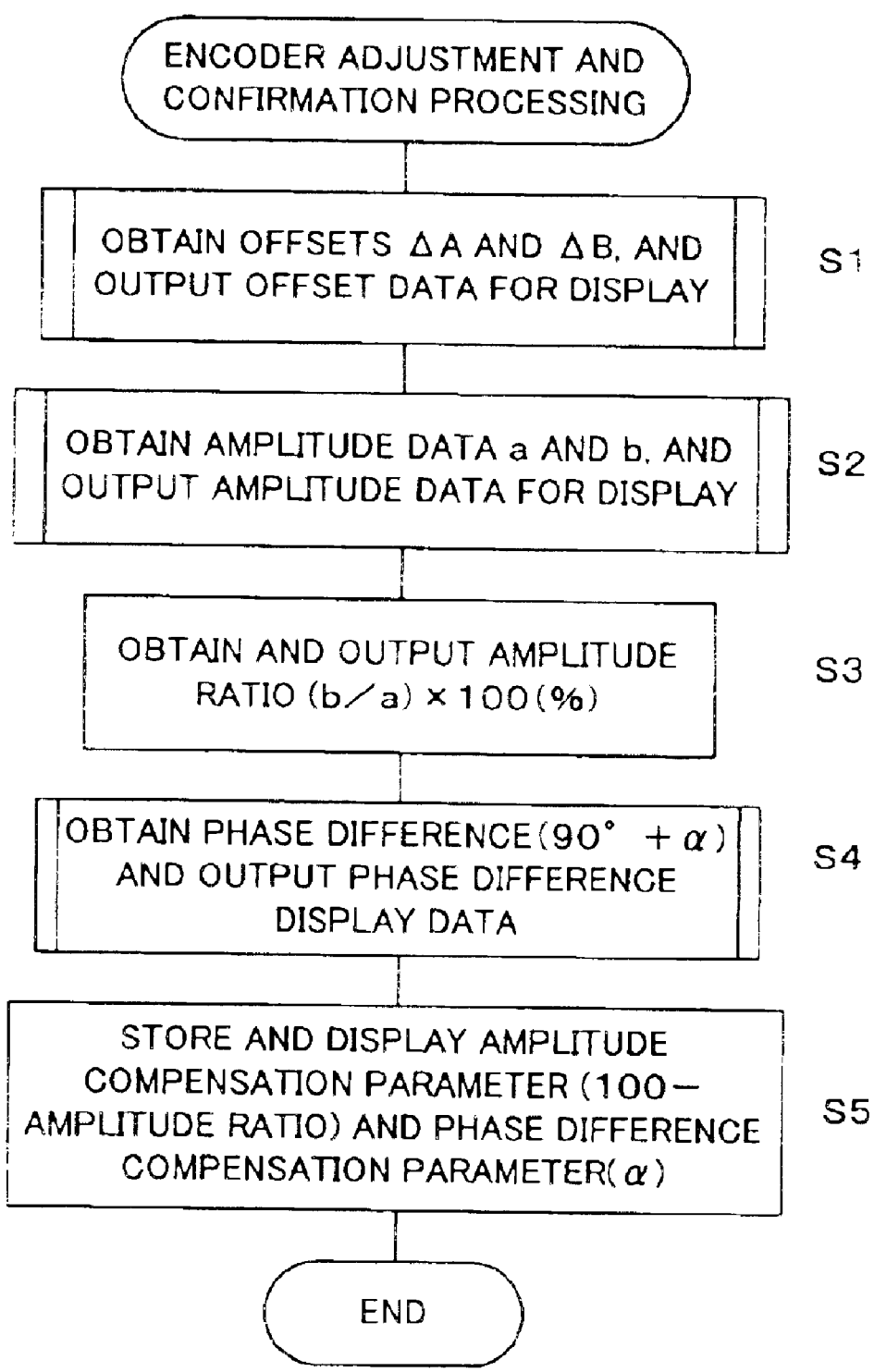
FIG. 4 is a flowchart of encoder adjustment and confirmation processing to be performed by a processor of the motor controller.

After switching an operation mode of the numerical controller 1 to an encoder adjusting/confirmation mode and drive of the spindle is started, the processor of the motor controller starts the processing as shown in FIG. 4.

First, the offset data ΔA and ΔB of A-phase and B-phase are obtained based on the digital feedback signals after being subjected to A/D conversion by the detecting circuits 24 and 25. Each of the obtained offset data ΔA and ΔB are divided by an amplification of the A/D conversion to obtain respective display data in the unit of mV, and displayed by the display section 28 and/or a display device of the numerical controller 1 (Step S1).

Figure 5:
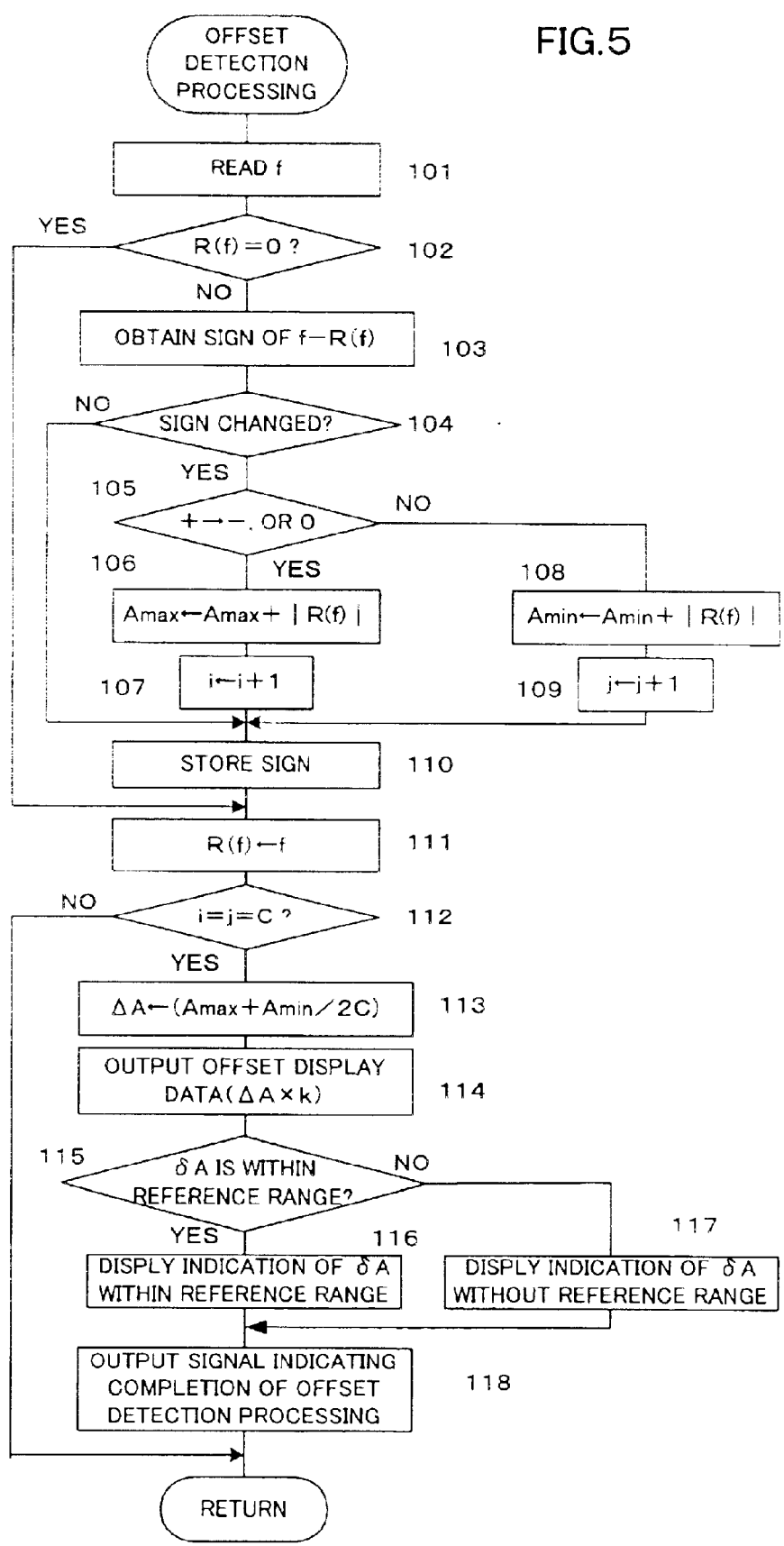
FIG. 5 is a flowchart of offset detection processing.

An example of processing for obtaining the offset data is shown in FIG. 5. The processor executes this processing at every predetermined period. In FIG. 5, only the processing for obtaining the offset data of A-phase is shown and the offset data of B-phase are obtained in the same manner.

First, the A-phase feedback signal f converted into digital signal is read (Step 101). It is determined whether or not a value stored in a register R(f) for storing the feedback signal data of A-phase is "0" (Step 102). The register R(f), registers Amax and Amin, and registers for storing indexes i and j are all set to "0" in an initial setting when the encoder adjusting/confirming processing is started. Thus, a determination result in Step 102 is initially "YES" and the procedure proceeds to Step 111 where the feedback signal data f read in Step 101 is stored. It is determined whether or not the indexes i and j are of a set value C (Step 112). Since the indexes 1 and j are initially set to "0", the procedure in this processing period terminates.

In the subsequent processing period, since the value stored in the register R(f) is not "0", the procedure proceeds from Step 102 to Step 103 to obtain a sign of a difference obtained by subtracting the value of the register R(f) from the data f read at Step 101. It is determined whether the sign is changed or not by comparing the obtained sign and the sign stored in a register for storing the sign (Step 104). If the register stores no sign, i.e. stores "0", it is deemed that the sign is not changed irrespective of the obtained sign of "+" or "−".

In the case where the sign is not changed, the procedure proceeds to Step 110 where the sign obtained in Step 103 is stored in the register and then the data f read in Step 101 is stored in the register R(f) (Step 111). Then, it is determined whether or not the indexes i and j are of the set value C (Step 112) and if the indexes are not of the set value C, the procedure of this processing period terminates. Subsequently, the abovementioned processing is repeatedly executed at every processing period and when it is determined that the sign is changed at Step 104, it is determined whether or not the sign is changed from "+" to "−" or "0". Although it is unlikely that the sign obtained in Step 103 is "0", the sign might be "0" in dependence of resolution of the A/D converter and thus the determination in this step includes the case of the change of the sign from "+" to "0".

As can been seen in FIG. 2, the sign of the difference obtained by subtracting the feedback signal value in the present processing period from the feedback signal value in the immediately preceding processing period continuously becomes "+" until a value of the feedback signal f is of a local maximum. When the value of the signal f exceeds a local maximum, the sign of the difference becomes "−". Thus, if the sign is changed from "+" to "−" or "0", it is determined that the value stored in the register R(f) is a local maximum and an absolute value thereof is added to the value of the register Amax (Step 106). The register Amax is set to "0" in the initial setting. Then, the index i is incrementally increased by "1" (Step 107) and the procedure proceeds to Step 110.

When it is determined that the sign has changed in Step 104 and the determination result in Step 105 is "NO", i.e., the sign has changed from "−" to "+" or "0", it is determined that the value stored in the register R(f) is a local minimum and an absolute value thereof is added to the value of the register Amin (Step 108). Then, the index j is incrementally increased by "1" (Step 109) and the procedure proceeds to Step 110.

Subsequently, the abovementioned processing is repeatedly executed until both of the indexes i and j reach the set value C. When the indexes i and j reach the set value C, the register Amax stores the sum of the local maximums of the number of times C, and the register Amin stores the sum of the local minimum of the number of times C. Thus, when the indexes i and j reach the set value C in Step 112, an average value of the local maximums is obtained by dividing the value of the register Amax by C and an average value of the local minimums is obtained by dividing the value of the register Amin by C. Then, the average value of the local minimums is subtracted from the average value of the local maximums and the obtained difference is divided by 2 to obtain an amplitude of the feedback signal. A offset value ΔA is obtained by adding the obtained amplitude to the average value of the local minimums. The above calculations of the offset value ΔA is expressed as follows:

$$\Delta A = (A\min/C) + (1/2)\{(A\max/C) - (A\min/C)\}$$

$$= (1/2)\{(A\max + A\min)/C\}$$

Thus obtained offset data ΔA of A-phase is multiplied by a conversion coefficient k in the conversion from the digital signal value to the analog signal value (mV) to obtain display data for A-phase offset. The obtained data is displayed by the display section 28 and/or sent to the numerical controller 1 to be displayed by the display device of the numerical controller 1 (Step 114).

A reference value V0 (2.5 V in the example of FIG. 2) is subtracted from the analog offset value to obtain an offset value δA from the reference value V0, and it is determined whether or not the offset value δA is within a reference range (Step 115). An indication that the offset value δA is within the reference range or not is displayed by the display section 28 (Step 116 or 117). For example, an indication of "O" is displayed at a section for displaying an offset status of A-phase on a display device of the display section 28 if the offset value δA is not within the reference range, and no indication is displayed at that section if the offset value δA is within the reference range. A signal indicating completion of detection of the A-phase offset is outputted (Step 118) and the processing terminates.

For the B-phase, the similar processing is performed to obtain offset data δB of B-phase and offset display data of B-phase and the obtained display data are displayed by the display section 28 and/or the display device of the numerical controller 1. Further, an indication that the offset value δB is within the reference range or not is displayed.

Thus, the offset data ΔA and ΔB of A-phase and B-phase are obtained and the offset display data of A-phase and B-phase are displayed. The procedure proceeds to Step S2 in which amplitude data "a" of A-phase and amplitude data "b" of B-phase are obtained. The amplitude data "a" and "b" may be obtained by adopting the value of "{(Amax/C)−(Amin/C)}/2" obtained in Step 113. In this embodiment, however, the amplitude data "a" and "b" are obtained based on the feedback signal data after canceling the offsets in order to obtain more precise data.

As can be seen from FIG. 3, since the phase difference α is generally of a small value, when one of the A/D converted values of A-phase and B-phase after canceling the offsets is substantially "0", the other of the A/D converted values is of a positive or negative maximum value. Thus, an absolute value of the voltage of B-phase when the A/D converted value of A-phase is substantially "0", and an absolute value of the voltage of A-phase when the A/D converted value of B-phase is substantially "0" are obtained by predetermined times, and the amplitudes "a" and "b" are determined to be respective average values of the absolute values of A-phase and B-phase. Thus obtained amplitudes "a" and "b" are multiplied by the conversion coefficient k, which is determined by amplification of the A/D conversion to the analog value (mV), to obtain the amplitude display data and the obtained amplitude display data are displayed by the display section 28 and/or by the display device of the numerical controller 1.

Figure 6:
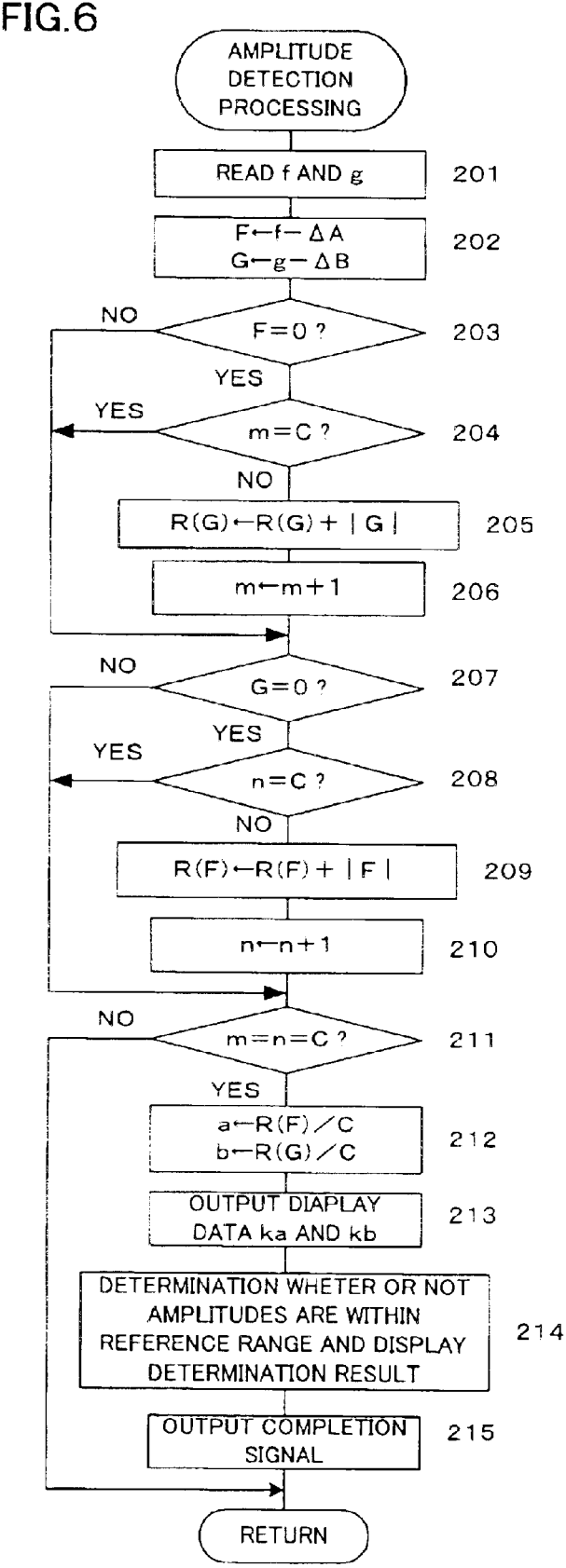
FIG. 6 is a flowchart of amplitude detection processing.

FIG. 6 is a flowchart of the processing of obtaining the amplitude data to be executed by the processor of the motor controller 2 at every processing period.

The digital feedback signals f and g of A-phase and B-phase, respectively, are read (Step 201). The offset data ΔA and ΔB obtained in Step S1 are subtracted from the read signals f and g, respectively, to obtain digital feedback signal data F and G with the offset canceled (Step 202). It is determined whether or not the A-phase digital signal F is substantially "0", i.e., within a set range centering "0" (Step 203). If the signal F is not substantially "0", it is determined whether or not the B-phase digital signal G is substantially "0" (Step 207). If the signal G is not substantially "0", it is determined whether or not both of the indexes m and n reach the set value C (Step 211). If both of the indexes m and n do not reach the set value C, the procedure of the present processing period is terminated. The indexes m and n, and registers R(G) and R(F) as described later are all set to "0" at the initial setting.

Subsequently, the above processing is repeatedly executed at every processing period and when it is determined that the A-phase digital feedback signal data F is substantially "0" in Step 203, it is determined whether or not the index m reaches the set value C (Step 204). If the index m does not reach the set value C, an absolute value of the B-phase digital feedback signal data G obtained in Step 202 is added to the register R(G) (Step 205). Then, the index m is incrementally increased by "1" (Step 206) and the procedure proceeds to Step 207.

Similarly, when it is determined that the B-phase digital feedback signal data G is substantially "0" in Step 207, it is determined whether or not the index n reaches the set value C (Step 208). If the index n does not reach the set value C, an absolute value of the A-phase digital feedback signal data F obtained in Step 202 is added to the register R(F) (Step 209). Then, the index n is incrementally increased by "1" (Step 210) and the procedure proceeds to Step 211.

In the subsequent processing period, when it is determined that the A-phase digital feedback signal data F is substantially "0", the processing from Step 204 to Step 206 is performed and when it is determined that the B-phase digital feedback signal data G is substantially "0", the processing from Step 208 to Step 210 is performed. Then, when both of the indexes m and n reach the set value C, i.e., the digital feedback signals G and F when the data of the other phase is substantially "0" have been added to the values of the registers R(G) and R(F), respectively, by C times, the procedure proceeds from Step 211 to Step 212. In Step 212, the value stored in the register R(F) is divided the set value C to obtain an average value of absolute values of the positive or negative maximums of A-phase as the amplitude "a" of A-phase. In the same manner, the value stored in the register R(G) is divided the set value C to obtain an average value of absolute values of the positive or negative maximums of B-phase as the amplitude "b" of B-phase.

The obtained amplitudes "a" and "b" are multiplied by the conversion coefficient k, which is determined by amplification of the A/D conversion to the analog value (mV), to obtain the amplitude display data and the obtained amplitude display data are displayed by the display section 28 and/or the display device of the numerical controller 1 (Step 213). It is determined whether or not the amplitudes "a" and "b" (mV) are within the reference range (Step 214) and the determination results for respective phases A and B are displayed on the display section 28 and/or the display device of the numerical controller 1. For example, if the amplitude of the feedback signal is within the reference range, a sign "F" is displayed, if the amplitude exceeds the reference range, a sign "H" is displayed and if the amplitude does not reach the reference range, a sign "L" is displayed. Then, a signal indicating a completion of the amplitude data detection processing is outputted (Step 215) and the amplitude data detection processing of Step S2 is terminated.

Then, a ratio between the amplitudes "a" and "b" obtained in Step S2 is calculated as follows;

Amplitude ratio=(B-phase amplitude/A-phase amplitude)×100(%)

=(b/a)×100(%)

The above amplitude ratio is sent to the display section 28 and/or the numerical controller 1 to be displayed by the display section 28 and/or the display device of the numerical controller 1 (Step S3).

In the next Step S4, the phase difference of the feedback signals of A-phase and B-phase is obtained. First, a principle of obtaining an error a of the phase difference will be described.

As described, the A-phase feedback signal $F(\theta)$ with offset canceled and the B-phase feedback signal $G(\theta)$ with offset canceled are expressed as follows;

$$F(\theta) = a \cdot \sin\theta \qquad (1)$$

$$G(\theta) = b \cdot \sin(\theta + 90° + \alpha) \qquad (2)$$
$$= b \cdot \cos(\theta + \alpha)$$

Assuming that the following relationship is fulfilled when $\theta$ is of a value $\theta 1$, $$F(\theta 1) = G(\theta 1) \qquad (3)$$

$$[\{F(\theta 1)\}^2 + \{G(\theta 2)\}^2]^{1/2} = R1 \qquad (4)$$

Assuming that the following relationship is fulfilled when $\theta$ is of a value $\theta 2$, $$F(\theta 2) = -G(\theta 2) \qquad (5)$$

$$[\{F(\theta 1)\}^2 + \{G(\theta 2)\}^2]^{1/2} = R1 \qquad (6)$$

From the equations (1), (2) and (3), the following equation is obtained.

$$\tan \theta 1 = b \cdot \cos \alpha / (b \cdot \sin \alpha + a) \qquad (7)$$

From the equations (1), (2) and (5), the following equation is obtained.

$$\tan \theta 2 = b \cdot \cos \alpha / (b \cdot \sin \alpha - a) \qquad (8)$$

From the equations (4) and (6), the following equation is obtained.

$$(R2/R1)^2 = [(1 + \tan^2 \theta 1)/\tan^2 \theta 1] \times [\tan^2 \theta 2/(1 + \tan^2 \theta 2)] \qquad (9)$$

The following equation is obtained by substitution using the equations (7) and (8), and rearranging the equation (9).

$$\sin \alpha = [(a^2 + b^2)/2ab] \times [(R2^2 - R1^2)/(R1^2 + R2^2)]$$

Thus, the error of the phase difference is given by $$\alpha = \sin^{-1}[(a^2 + b^2)/2ab] \times [(R2^2 - R1^2)/(R1^2 + R2^2)] \qquad (10)$$

As described above, the error $\alpha$ of the phase difference is obtained according to the equation (10). Since the amplitudes "a" and "b" are already obtained in Step S2, the error $\alpha$ is determined by determining values of R1 and R2.

Figure 7:
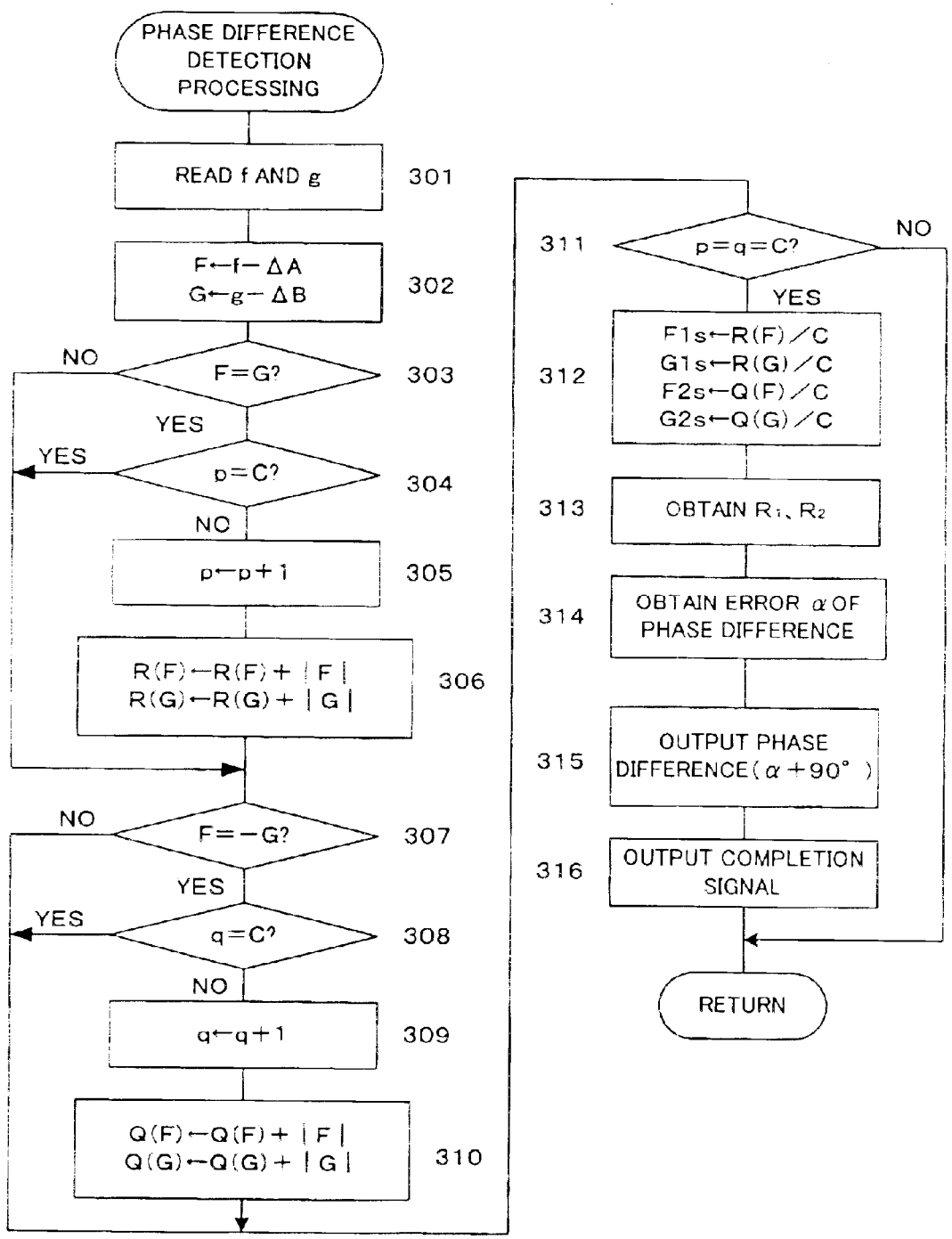
FIG. 7 is a flowchart of phase difference detection processing.

FIG. 7 shows processing for obtaining the error $\alpha$ of the phase difference to be performed by the processor of the motor controller 2 at every predetermined processing period.

First, the feedback signal data f and g of A-phase and B-phase, respectively, are read (Step 301). The offset data $\Delta A$ and $\Delta B$ obtained in Step S1 are subtracted from the feedback signal data f and g, respectively, to obtain the respective feedback signal data F and G of A-phase and B-phase with their offsets canceled (Step 302). It is determined whether or not the feedback signal data F and G are equal to each other (F=G?) (Step 303). If the feedback signal data F and G are not equal to each other, it is determined whether or not the feedback signal data F and G have the same absolute value and different signs (F=−G?) (Step 307). If the determination result in Step 307 is "NO", it is determined whether or not indexes p and q reach a set value C (Step 311). If the indexes p and q does not reach the set value C, the procedure in the present processing period terminates. The indexes p and q, registers R(F), R(G), Q(F) and Q(G) are all set to "0" at the initial setting.

If it is determined that the feedback signal data F and G are equal to each other (F=G) in Step 303, i.e., the relationship expressed by the equation (3) is fulfilled, the procedure proceeds to Step 304 where it is determined whether or not the index p reaches the set value C. If the index p does not reach the set value C, the index p is incrementally increased by "1" (Step 305) and the absolute value of the A-phase feedback signal data F obtained in Step 302 is added to the value of the register R(G) (Step 306), to proceed to Step 307.

If it is determined that the feedback signal data F and G have the same absolute value and different signs (F=−G) in Step 307, i.e., the relationship expressed by the equation (5) is fulfilled, the procedure proceeds to Step 308 where it is determined whether or not the index q reaches the set value C. If the index q does not reach the set value C, the index q is incrementally increased by "1" (Step 309) and the absolute value of the B-phase feedback signal data G obtained in Step 302 is added to the value of the register Q(G) (Step 310), to proceed to Step 311.

In Step 311, it is determined whether or not both of the indexes p and q reach the set value C and if both of the indexes p and q do not reach the set value C, the processing of the present processing period is terminated.

Subsequently, the above processing is repeatedly executed until both of the indexes p and q reach the set value C, so that the absolute values of the A-phase and B-phase feedback data F and G when the feedback data F and G are equal to each other, are added to the register R(F) and R(G), respectively, by C times. Also, the absolute values of the A-phase and B-phase feedback data F and G when the feedback data F and G have the same absolute value and different signs are added to the register Q(F) and Q(G), respectively, by C times.

When it is determined that both of the indexes p and q reach the set value C in Step 311, the respective values of the registers R(F), R(G), Q(F) and Q(G) are divided by the number C, to obtain average values F1s, G1s, F2s and G2s as follows; (Step 312)

$$F1s = R(F)/C$$

$$G1s = R(G)/C$$

$$F2s = Q(F)/C$$

$$G2s = Q(G)/C$$

The value of R1 in the equation (4) is determined based on thus obtained average values F1s and G1s, and the value of R2 in the equation (6) is determined based on the average values F2s and G2s (Step 313), as follows;

$$R1 = [F1s^2 + G1s^2]^{1/2}$$

$$R2 = [F2s^2 + G2s^2]^{1/2}$$

The error $\alpha$ of the phase difference is determined according to the equation (10) using the obtained R1 and R2 and the amplitude data "a" and "b" obtained in Step S2 (Step 314).

A 90 degree is added to the error $\alpha$ of the phase difference and the obtained phase difference (90°+$\alpha$) is displayed by the display section 28 and/or the data of the phase difference (90°+α) are sent to the numerical controller 1 and displayed by the display device of the numerical controller 1 (Step 315). Then, a signal indicating completion of the phase difference detection is outputted (Step 316) and the phase difference detection processing is terminated.

Finally, a value obtained by subtracting the amplitude ratio obtained in Step S3 from "100" as the parameter for compensating the amplitude ratio, and the error α of the phase difference obtained in Step 314 as the parameter for compensating the phase difference are stored in the storing section 27. The amplitude ratio compensating parameter and the phase difference compensating parameter are displayed by the display section 28 and/or the display device of the numerical controller 1 (Step S5) and the encoder adjustment/confirmation processing is terminated.

According to the present invention, it is not necessary to observe wave forms of feedback signals inputted to a motor controller from an encoder with a special measuring device such as oscilloscope in adjusting/confirming the analog feedback signals from the encoders, so that a state of the analog feedback signals is easily discriminated. Further, since the special measuring device is unnecessary and acceptability of the analog feedback signals is judged automatically, the adjustment and confirmation of the feedback signals are simplified and facilitated.

What is claimed is:

1. A motor controller for performing control of position or velocity of a movable member mechanically connected with a motor using analog feedback signals from encoders for detecting rotational position or velocity of the motor, or position or velocity of the movable member, wherein said motor controller includes means for automatically A/D converting, determining and displaying information on at least one of amplitudes, offsets and a phase difference of the analog feedback signals on a digital display section of the motor controller or a host controller connected with the motor controller.

2. A motor controller according to claim 1, wherein the display section of the motor controller includes a LED display device.

3. A motor controller according to claim 1, wherein the display section of the motor controller includes a seven-segment display device.

4. A motor controller according to claim 1, wherein the display section of the motor controller includes a display device connected with the motor controller.

5. A motor controller according to claim 1, wherein the information on at least one of the amplitudes, the offsets and the phase difference is obtained based on A/D conversion values of the analog feedback signals.

6. A motor controller according to claim 1, further including means for calculating at least one of the offsets, the amplitudes and the phase difference of the analog feedback signals of two different phases.

7. A motor controller for performing control of position or velocity of a movable member mechanically connected with a motor using analog feedback signals from encoders for detecting rotational position or velocity of the motor, or position or velocity of the movable member, wherein said motor controller includes means for automatically A/D converting, determining and displaying results of comparison of amplitudes and/or offsets of the analog feedback signals with respective predetermined values on a digital display section of the motor controller or a host controller connected with the motor controller.

8. A motor controller according to claim 7, wherein the display section of the motor controller includes a LED display device.

9. A motor controller according to claim 7, wherein the display section of the motor controller includes a seven-segment display device.

10. A motor controller according to claim 7, wherein the display section of the motor controller includes a display device connected with the motor controller.

11. A motor controller according to claim 7, wherein the amplitudes and/or the offsets are obtained based on ND conversion values of the analog feedback signals.

12. A motor controller according to claim 7, further including means for calculating the offsets and/or the amplitudes of the analog feedback signals of two different phases.

13. A motor controller for performing control of position or velocity of a movable member mechanically connected with a motor using analog feedback signals from encoders for detecting rotational position or velocity of the motor, or position or velocity of the movable member, said motor controller comprising:

a converter converting the analog feedback signals into digital feedback signals;

a processor unit automatically determining at least one of amplitudes, offsets and a phase difference of the analog feedback signals; and a digital display displaying the at least one of the amplitudes, offsets and a phase difference of the analog feedback signals section of the motor controller.

14. A motor controller for performing control of position or velocity of a movable member mechanically connected with a motor using analog feedback signals from encoders for detecting rotational position or velocity of the motor, or position or velocity of the movable member, said motor controller comprising:

a converter converting the analog feedback signals into digital feedback signals;

a processor unit automatically performing comparisons of amplitudes and/or offsets of the analog feedback signals with respective predetermined values; and a digital display displaying at least one of the comparisons of amplitudes and/or offsets of the analog feedback signals with respective predetermined values.

15. An apparatus, comprising:

a motor controller performing control of position or velocity of a movable member mechanically connected with a motor using analog feedback signals from encoders for detecting rotational position or velocity of the motor, or position or velocity of the movable member, said motor controller including:

a converter converting the analog feedback signals into digital feedback signals;

a processor unit automatically performing a comparisons of amplitudes and/or offsets of the analog feedback signals with respective predetermined values; and a digital display displaying the at least one of the comparisons of amplitudes and/or offsets of the analog feedback signals with respective predetermined values, wherein the processor unit obtains an offset value ΔA according to a formula $$\Delta A = \frac{A_{MAX} + A_{MIN}}{2C},$$

where $A_{max}$ is a maximum amplitude value, $A_{min}$ is a minimum amplitude value and C is a predetermined value.

16. An apparatus, comprising:
a motor controller controlling position or velocity of a movable member mechanically connected with a motor using analog feedback signals from encoders for detecting rotational position or velocity of the motor, or position or velocity of the movable member, said motor controller including:
a converter converting the analog feedback signals into digital feedback signals;
a detecting circuit performing A/D conversion of the analog feedback signals using amplitude ratio and phase difference compensation parameters,
a processor unit automatically performing comparisons of offsets of the analog feedback signals with respective predetermined values; and
a digital display displaying at least one of the comparisons of amplitudes and/or offsets of the analog feedback signals with respective predetermined values,
wherein the processor unit feeds back a compensated signal based on offsets of the analog feedback signals to control position or velocity of the motor.

17. A method for controlling position or velocity of a movable member mechanically connected with a motor using analog feedback signals from encoders for detecting rotational position or velocity of the motor, or position or velocity of the movable member, the method comprising:
converting the analog feedback signals into digital feedback signals;
performing automatically comparisons of amplitudes and/or offsets of the analog feedback signals with respective predetermined values; and
displaying digitally at least one of the comparisons of amplitudes and/or offsets of the analog feedback signals with respective predetermined values,
wherein the comparisons obtain an offset value $\Delta A$ according to a formula $$\Delta A = \frac{A_{MAX} + A_{MIN}}{2C},$$

where $A_{max}$ is a maximum amplitude value, $A_{min}$ is a minimum amplitude value and C is a predetermined value.

18. A method for controlling position or velocity of a movable member mechanically connected with a motor using analog feedback signals from encoders for detecting rotational position or velocity of the motor, or position or velocity of the movable member, the method comprising:
converting the analog feedback signals into digital feedback signals;
performing A/D conversion of the analog feedback signals using amplitude ratio and phase difference compensation parameters,
performing automatically comparisons of offsets of the analog feedback signals with respective predetermined values;
displaying digitally at least one of the comparisons of amplitudes and/or offsets of the analog feedback signals with respective predetermined values; and
feeding back a compensated signal based on offsets of the analog feedback signals to control position or velocity of the motor.

19. A motor controller for controlling a movable member mechanically connected to a motor using a plurality of analog feedback signals, comprising:
an encoder configured to detect at least one of a rotational position and a velocity of the motor and to generate the analog feedback signals:
a digital display; and
a display unit configured to automatically perform analog-to-digital conversion and to determine and display information on at least one of amplitudes, offsets and a phase difference of the analog feedback signals on the digital display.

20. A motor controller for controlling a movable member mechanically connected to a motor using a plurality of analog feedback signals, comprising:
an encoder configured to detect at least one of a position and a velocity of the movable member and to generate the analog feedback signals;
a digital display; and
a display unit configured to automatically perform analog-to-digital conversion and to determine and display information on at least one of amplitudes, offsets and a phase difference of the analog feedback signals on the digital display,
wherein the motor controller controls at least one of a position and a velocity of the movable member.

* * * * *

UNITED STATES PATENT AND TRADEMARK OFFICE
CERTIFICATE OF CORRECTION

PATENT NO. : 6,822,414 B2
DATED : November 23, 2004
INVENTOR(S) : Yuuki Morita et al.

It is certified that error appears in the above-identified patent and that said Letters Patent is hereby corrected as shown below:

Title page,
Item [56], References Cited, U.S. PATENT DOCUMENTS, please add the following references:

| | | |
|---|---|---|
| -- 3,940,675 | 3/76 | Schroeder |
| 4,393,690 | 7/83 | Lowen et al. |
| 4,843,292 | 6/89 | Ono et al. |
| 5,742,136 | 4/98 | Ono et al. --. |

Column 5,
Line 21, change "$\delta B$" to -- $\Delta B$ --.

Column 7,
Lines 5, 10, 23 and 26, change "a" to -- $\alpha$ --.
Line 34, change "$\alpha = \sin^{-1}[(\alpha^2 + b2)/2\ \alpha b]$" to -- $\alpha = \sin^{-1}[(a^2 + b^2)/2ab]$ --.

Column 10,
Line 8, change "ND" to -- A/D --.

Signed and Sealed this

Eighteenth Day of October, 2005

JON W. DUDAS
*Director of the United States Patent and Trademark Office*